(12) United States Patent
Glassner

(10) Patent No.: US 7,775,932 B2
(45) Date of Patent: Aug. 17, 2010

(54) MANUAL HELICAL PLANETARY TRANSMISSION AND POWER DIVIDER FOR MOTOR VEHICLES COMPRISING SAID TRANSMISSION

(75) Inventor: Rudolf Glassner, Kottes (AT)

(73) Assignee: Magna Powertrain AG & Co KG, Lannach (AT)

( * ) Notice: Subject to any disclaimer, the term of this patent is extended or adjusted under 35 U.S.C. 154(b) by 224 days.

(21) Appl. No.: 11/920,316

(22) PCT Filed: May 16, 2006

(86) PCT No.: PCT/EP2006/004617

§ 371 (c)(1),
(2), (4) Date: Feb. 7, 2008

(87) PCT Pub. No.: WO2006/122753

PCT Pub. Date: Nov. 23, 2006

(65) Prior Publication Data

US 2009/0013809 A1    Jan. 15, 2009

(30) Foreign Application Priority Data

May 17, 2005    (AT) .............................. GM326/2005

(51) Int. Cl.
*F16H 3/44*    (2006.01)
(52) U.S. Cl. ..................................... 475/299
(58) Field of Classification Search .................. 475/299
See application file for complete search history.

(56) References Cited

U.S. PATENT DOCUMENTS

| 4,131,186 A | * | 12/1978 | Marquis et al. | ............ | 192/69.7 |
| 4,773,518 A | * | 9/1988 | Raad et al. | ................. | 192/84.1 |
| 4,821,591 A |   | 4/1989 | Adler |   |   |
| 5,083,993 A | * | 1/1992 | Oun | ........................... | 475/299 |
| 5,695,426 A |   | 12/1997 | Lippitsch et al. |   |   |
| 5,871,415 A |   | 2/1999 | Fuehrer et al. |   |   |
| 6,066,062 A |   | 5/2000 | Pigozzi |   |   |
| 6,248,038 B1 | * | 6/2001 | Nilsson et al. | ............. | 475/286 |
| 6,896,638 B2 | * | 5/2005 | Nilsson | ...................... | 475/299 |

(Continued)

FOREIGN PATENT DOCUMENTS

EP    0 239 555 A2    9/1987

(Continued)

*Primary Examiner*—Dirk Wright
(74) *Attorney, Agent, or Firm*—Harness, Dickey & Pierce, P.L.C.

(57) ABSTRACT

A manual helical planetary transmission comprises a housing, a sun gear, a planet carrier with helical planetary gears and an axially displaceable ring gear which can be coupled to the housing or to the planet carrier. The transmission provides a compact and easy-to-produce solution for locking the gears. For this purpose, first saw-tooth coupling teeth are provided on both sides of the fronts of the ring gear and have a gently sloping first profile. Second saw-tooth coupling teeth provided on the housing and the planet carrier have a gently sloping profile and fit into the first coupling teeth. In the respective gear, the peripheral forces acting upon the ring gear force the gently sloping first profiles of the first coupling teeth against the gently sloping first profiles of the second coupling teeth on the housing or the planet carrier, thereby frictionally keeping the ring gear in the respective engaged position.

14 Claims, 3 Drawing Sheets

U.S. PATENT DOCUMENTS

2003/0040393 A1 2/2003 Alfredsson
2004/0242369 A1 12/2004 Alfredsson
2005/0009660 A1 1/2005 Nishiji

FOREIGN PATENT DOCUMENTS

| | | |
|---|---|---|
| EP | 0 916 872 A1 | 5/1999 |
| EP | 1 495 900 A2 | 1/2005 |
| WO | 01/01016 A1 | 1/2001 |

\* cited by examiner

MANUAL HELICAL PLANETARY TRANSMISSION AND POWER DIVIDER FOR MOTOR VEHICLES COMPRISING SAID TRANSMISSION

CROSS-REFERENCE TO RELATED APPLICATIONS

This application is a National Stage of International Application No. PCT/EP2006/004617, filed May 16, 2006, and claims the benefit of Austrian Patent Application No. GM0326/2005, filed May 17, 2005. The disclosures of the above applications are incorporated herein by reference in their entirety.

FIELD

The present disclosure relates to a manual helical planetary transmission consisting of a housing, of a sun gear, a planet carrier with helical planet gears and of an axially displaceable annulus gear which can be selectively coupled to the housing or to one of the two other members of the planetary transmission, in particular to the planet carrier.

BACKGROUND

The statements in this section merely provide background information related to the present disclosure and may not constitute prior art.

When used in a motor vehicle, a choice is made, for example, between a road gear and an offroad gear. It can, however, also be a question of the end stage of a utility vehicle transmission. Helical transmissions are preferred for reasons of noise development. However, helical transmissions have the disadvantage that the axial forces arising due to the helical teeth have to be supported. This can take place via a suitable bearing with the planet gears. With non-manual planetary transmissions, the removal takes place via the bearings of the adjoining shafts.

There are two possibilities with manual planetary transmissions. The annulus gear may be non-displaceable and surrounded by a displaceable selector sleeve, but the annulus gear must then be supported in the axial direction, which is not possible due to its large diameter. Alternatively, the annulus gear may be displaceable, which additionally saves construction space and costs, but the annulus gear must then be fixed axially in its respective shifting position.

It is known from EP 916 872 B1 for the locking of a helical annulus gear in the axial direction equally to use helical teeth as retaining teeth that cooperate with corresponding retaining teeth. The peripheral force acting on the helical teeth produces an axial force at the retaining teeth opposite to the axial force acting on the annulus gear. The requirement of construction space in the axial direction, however, is disadvantageous here. Furthermore, the retaining teeth are complex and/or expensive in production and synchronization is difficult to accommodate.

SUMMARY

The present disclosure provides a locking arrangement in a generic planetary transmission which requires little construction space, is simple to produce, and limits the freedom of the designer less, with it naturally satisfying all functional demands.

Unlike EP 916 872 B1, the peripheral force acting on the helical teeth is passed on to the coupling teeth where it produces forces disposed in a plane normal to the axis thanks to the interaction of the gently rising first flanks. These normal forces acting on the first flanks effect a friction transmitting connection between the first flanks proportional to the peripheral force. This friction transmitting connection prevents a displacement of the annulus gear by the axial force originating from the helical teeth. Since the flanks are axially directed, the annulus gear may easily be brought into the respective shift position, even when stationary.

Particularly favorable construction conditions apply when of the one of the two other members of the planetary transmission it is the planet carrier which can be coupled to the axially displaceable annulus gear.

Although it would also be conversely possible, the first coupling teeth may project inwardly and the second coupling teeth outwardly, and the pitch circle of the first and second coupling teeth may have a larger radius than the pitch circle of the running teeth of the annulus gear. Such a construction simplifies the processing of both components supporting the coupling teeth and, ultimately, saves construction space.

The angle of inclination of the gently rising flanks with respect to a tangent at the pitch circle amounts to 25 to 30 degrees with a helical angle of the running teeth of 11 degrees. To utilize the periphery of the components equipped with the coupling teeth to the maximum, a steeply falling second flank follows the gently rising flank in the first and second coupling teeth. The angle of inclination of the steeply falling flanks may amount to 45 to 62 degrees. Due to the helical teeth, the effect in accordance with the present disclosure is only needed in one sense of rotation; in the opposite sense of rotation, the annulus gear may be pressed against a component without a relative rotation.

The first and the second coupling teeth may have roof-shaped boundary surfaces at the end face (in the peripheral section) and the flanks may have an undercut with an angle from 1 to 5 degrees. The latter facilitates the entering of the first coupling teeth into the second coupling teeth, while the former provides additional security against a jumping out of the gear on strong impacts.

To spare the first flanks of the cooperating coupling teeth, the first flanks may be made slightly convex or slightly concave in the section normal to the axis.

The second coupling teeth, which may be formed in saw-tooth-like manner all around in the section normal to the axis at the housing and at the planet carrier, may be formed at a toothed ring. This facilitates the processing and installation in a transmission housing, with the rings even being able to be common parts.

The present disclosure also relates to a transfer case having the manual helical planetary transmission described above, wherein the drive takes place via the sun gear and the output drive via the planet carrier and the sawtooth-like second coupling teeth are attached to the planet carrier for the provision of a road gear and to the housing for the provision of an offroad gear.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
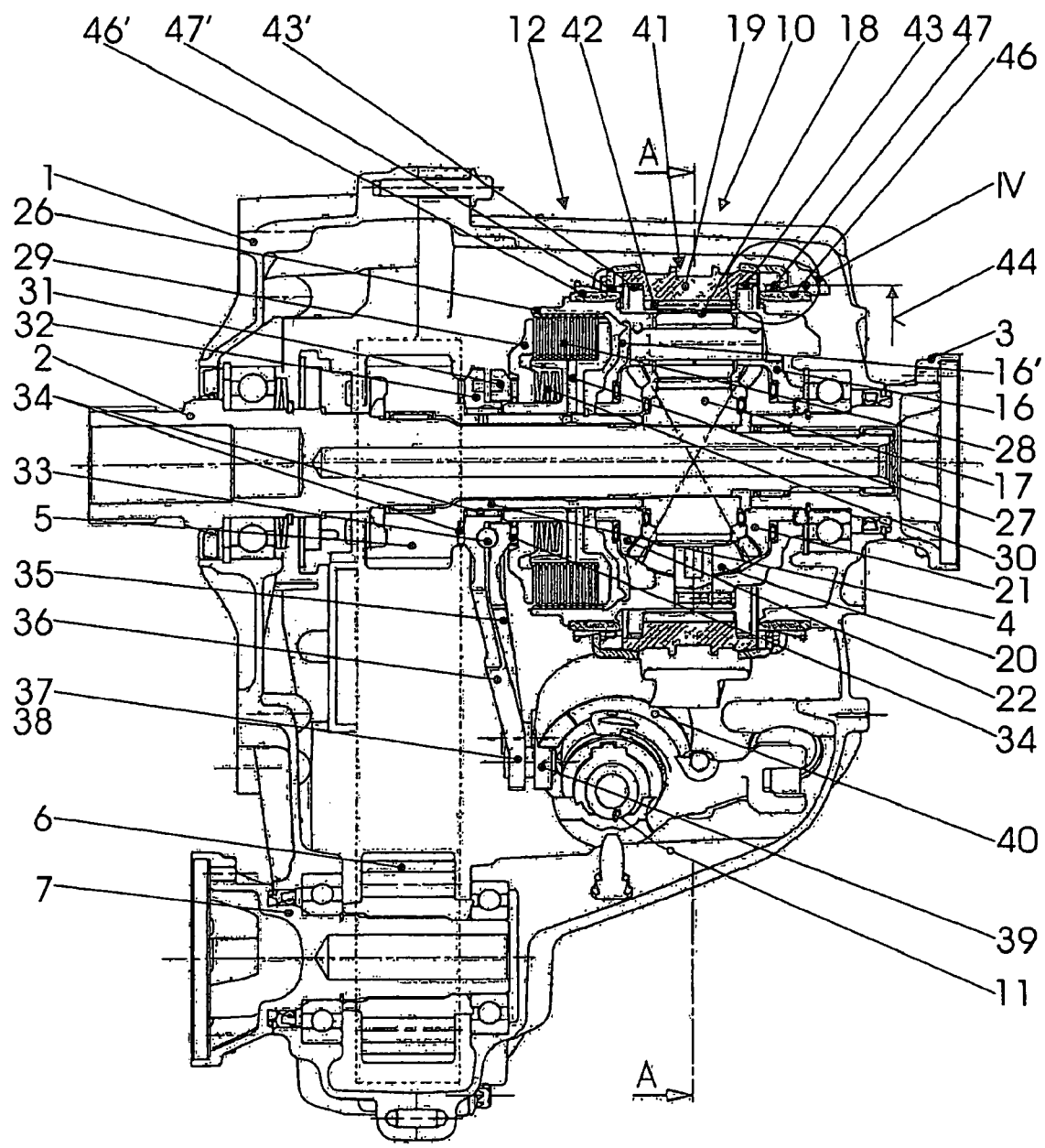
FIG. 1 illustrates a transfer case having the planetary transmission in accordance with the present disclosure in the longitudinal section.

FIG. 1 illustrates a housing 1 of a transfer case, an input shaft 2 coming from a drive unit (not shown) of a vehicle (not shown), a first output shaft 3 connected drivewise to a rear axle (not shown), and a second output shaft 4 connected drivewise to a front axle (not shown). The second output shaft 4 drives, by means of a first toothed belt gear 5, a second toothed belt gear 6 under the input shaft 2 which is seated on an output shaft 7 for the drive of the front axle.

A differential transmission 10 is provided for the transfer of the torque onto the two output shafts 3, 4. Furthermore, a control unit 11 is provided under the differential gear 10 and a lock clutch 12 is provided for locking of the differential gear 10. The lock clutch 12 may be combined with the differential gear 10 in a constructional manner. It could, however, also be arranged separately, even somewhere else in the transfer case or in the drivetrain. The differential gear 10 may also be made very differently within the framework of the present disclosure.

Figure 2:
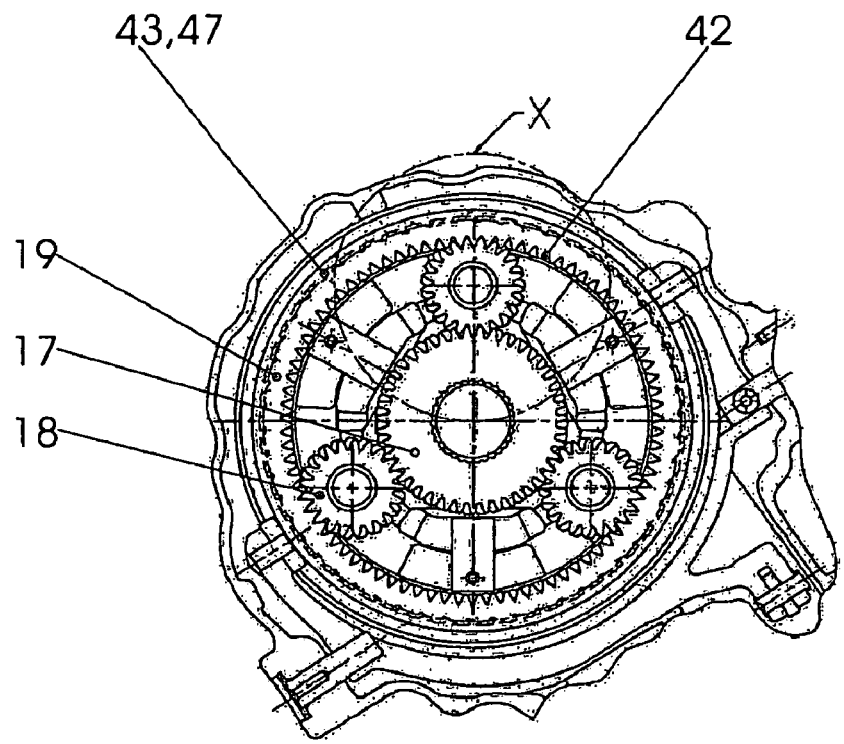
FIG. 2 illustrates a section according to AA in FIG. 1.

In FIG. 1 and FIG. 2, an example of the differential gear according to the present disclosure is illustrated. A sun gear 17 rotationally fixedly connected to the input shaft 2, planet gears 18 of the offroad gear ratio rotatably supported in the differential housing 16 as well as first balance gears 21 and second balance gears 22 are located in the interior of the differential housing 16 which here simultaneously serves as a planet carrier. The first balance gears 21 are rotationally fixedly connected to the first output shaft 3 and the second balance gears 22 are rotationally fixedly connected to the second output shaft 4. The differential housing 16 is surrounded by an annulus gear 19 which is axially displaceable and is rotationally fixedly connected to the differential housing 16 in the offroad gear. This particular embodiment of the differential gear 10 is the subject of Austrian patent 405 157 and its manner of construction and operation is described in more detail there.

The lock clutch 12 is also shown in detail in FIG. 1. It consists of a clutch housing 26 which is fixedly connected to or is in one piece with the differential housing 16, of an inner coupling part 27 which is rotationally fixedly connected to the second output shaft 4, of a disk jacket 28, and of a pressure plate 29 which is acted on by restoring springs 30 in the direction of opening. Two rings 31, 32 are arranged between the pressure plate 29 and the second output plate, here in particular the first toothed belt gear 5 seated thereon. Balls 33 are located in corresponding peripheral grooves between these rings 31, 32. These peripheral grooves are formed as ramps in one of the rings, or in both, so that during relative rotation of the two rings with respect to one another an axial force is generated by the balls running up on the ramp. The two rings 31, 32 are fully stationary when the clutch is not actuated. Both rings 31, 32 are therefore supported on needle bearings 34 for the rotational decoupling. The first ring 31 has a first ramp lever 35, the second ring 32 has a second ramp lever 36, and they are fixedly connected to the ring at one end, project downwardly, and have rolls 39 at their free ends 37, 38. A rotatable control cam 40 is located between the two rolls 39. On a rotation of this control cam, the rolls 39 are moved apart and the rings 31, 32 are rotated with respect to one another via the ramp levers 35, 36 moved in the manner of scissors. The differential gear 10 is constructionally combined with the planetary transmission in this embodiment for the formation of an offroad gear, which is, however, not significant according to the present disclosure.

The present disclosure relates to the planetary transmission which substantially consists of the sun gear 17, the planet carrier 16, 16' with the planet gears 18 and the annulus gear 19 (see also FIG. 2). The gears 17, 18 and 19 are helical and the annulus gear 19 is displaceable in the axial direction, to the left in the road gear, to the right in the offroad gear.

The annulus gear 19 has a peripheral groove 41 for the engagement of a shift fork which is indicated in FIG. 2 and by means of which it is pushed into the one or the other shift position. It is in a neutral position in FIG. 1. To hold the annulus gear 19 fixedly in the respective shift position against the axial force exerted by the helical running teeth, coupling teeth 43, 43' are provided on both end faces of said annulus gear. It runs all around in the annulus gear 19 and extends inwardly, it is therefore a type of inner gear. It is arranged on a larger radius 44 than the radius of the running teeth 42. A toothed ring 46 is fastened, for example pressed in, to the housing 1 on the side of the annulus gear 19 at the right in the Figure. A toothed ring 46' is likewise fixedly connected to the planet carrier 16' at the left side. The two toothed rings 46, 46' likewise have a coupling tooth arrangement 47, 47' that cooperates with the respective coupling tooth arrangement 43, 43'. The coupling tooth arrangements 43, 43' and 47, 47' are to be made as in the following, especially designed in accordance with the present disclosure.

Figure 3:
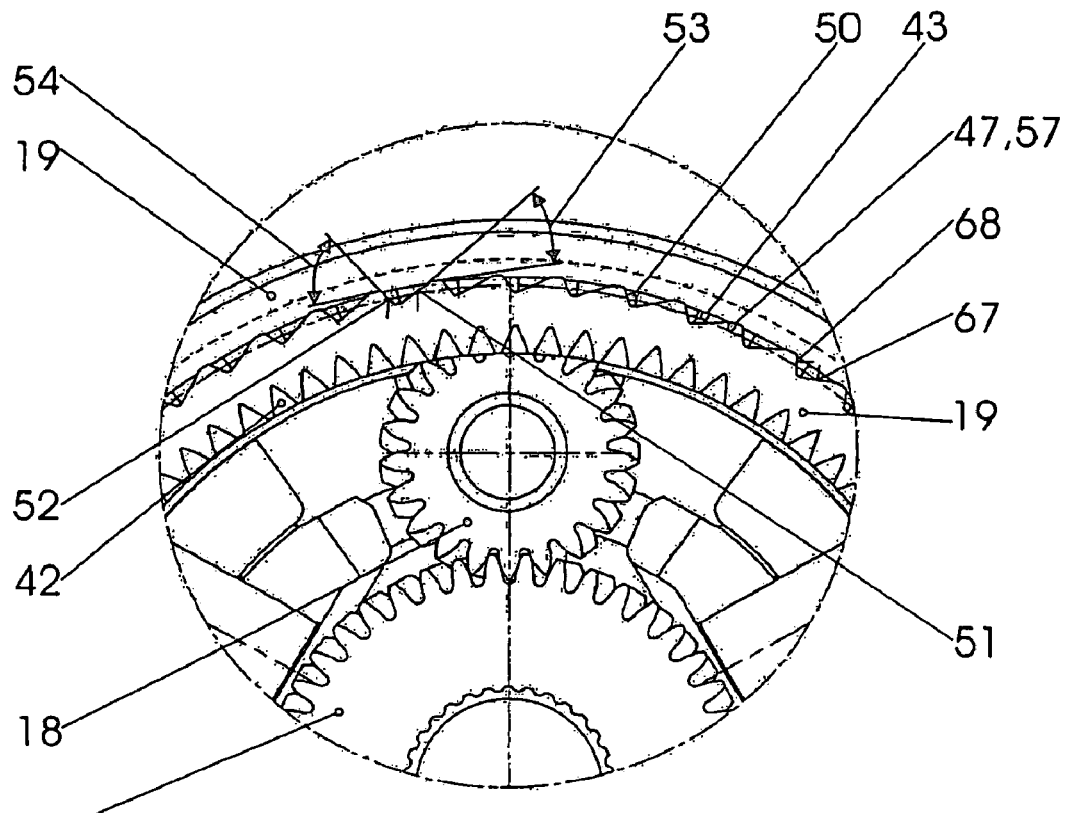
FIG. 3 illustrates detail X in FIG. 2, as a view in the direction of arrow A in FIG. 1.

The coupling tooth arrangement 43 and 47 can be recognized better in FIG. 2, and larger in FIG. 3, in broken lines in the section of FIG. 2, as a coupling tooth arrangement 43' or 47' as a full line in the view of FIG. 3. The coupling tooth arrangement at both sides are identical and mirror-inverted to one another. They are therefore only described for the coupling tooth arrangement 43 and 47. The inwardly directed coupling teeth 50 of the coupling tooth arrangement 43 are of sawtooth shape in the section normal to the axis; they consist of one gently rising flank 51 and one steeply falling flank 52. The first includes an angle 53 of approximately 25 to 30 degrees with a tangent at its pitch circle, the second includes an angle 54 of approximately 45 to 62 degrees. The outwardly directed coupling teeth 57 of the toothed ring 46 have the same contour. They have a gently rising flank 67 and a steep flank 68.

If a peripheral force (in FIG. 3) acts on the annulus gear 19 counter clockwise, the gently rising flanks 51 of the coupling teeth 50 and 57 are pressed against one another. Due to the relatively acute angle 53, a very high surface pressing arises and thereby furthermore a friction transmitting connection which holds the annulus gear 19 fixedly at the toothed ring 46 fixed to the housing. In open thrust operation, that is with engine braking, the axial force acts in the opposite direction and the annulus gear 19 is pressed against the toothed ring 46, with its end face 58 contacting it. The annulus gear 19 thus maintains itself in the coupled position. In road gear, the annulus gear 19 at the left engages with its coupling tooth arrangement 43' into the coupling tooth arrangement 47' of the toothed ring 46'. Since, in this case, the torque acts in the opposite direction, the coupling teeth 43', 47' are mirror-inverted on this side. This also means that the toothed ring 46' can be of the same construction as the toothed ring 46 on the other side.

Figure 4:
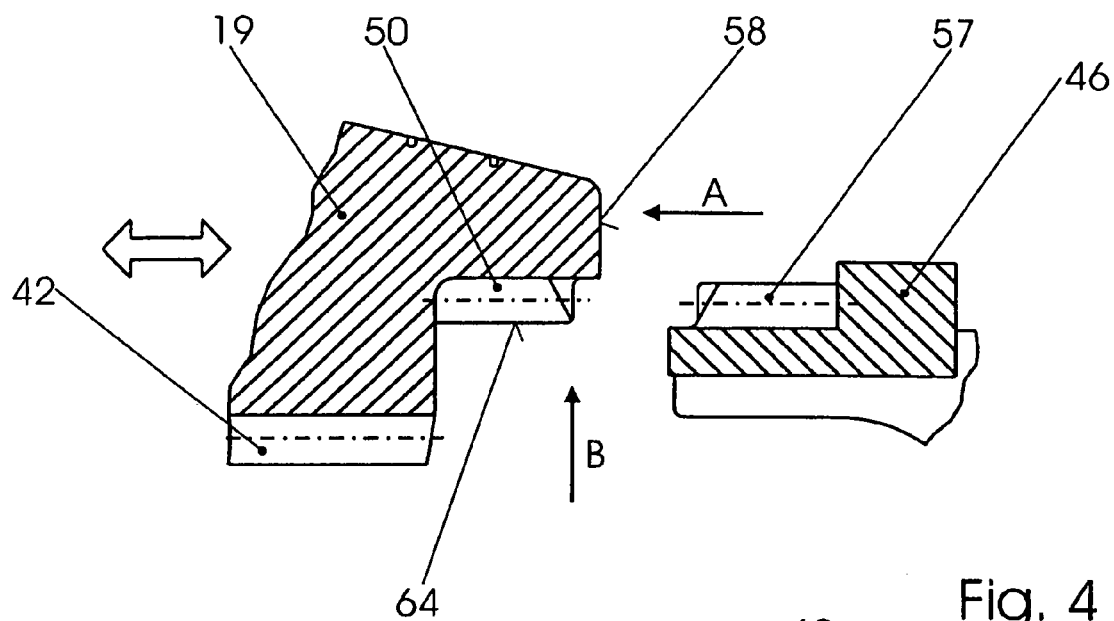
FIG. 4 illustrates detail IV in FIG. 1.
Figure 5:
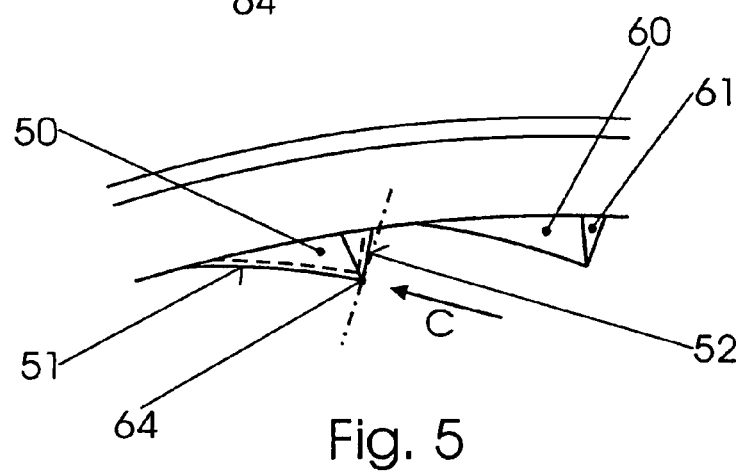
FIG. 5 illustrates a view toward A in FIG. 4.
Figure 7:
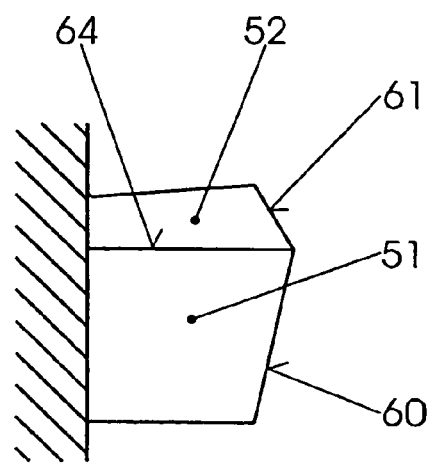
FIG. 7 illustrates a view toward B in FIG. 4.

FIGS. 4, 5 and 7 show the coupling teeth 50, 57 in detail. The two flanks 51, 52 intersect in a line 64 which is parallel to the axis of rotation of the planetary transmission. The coupling teeth 50 have sloped roof surfaces 60, 61 at their end faces which prevent an out of mesh position on coupling. The flanks 51, 52 are basically planar surfaces; however, the gently rising flank 51 can be concave or convex, which can be seen in FIG. 5. Here, the coupling teeth 50 of the coupling teeth 43 are made with concave flanks and the coupling teeth 57 of the coupling teeth 47 with convex flanks 51, 52.

Figure 6:
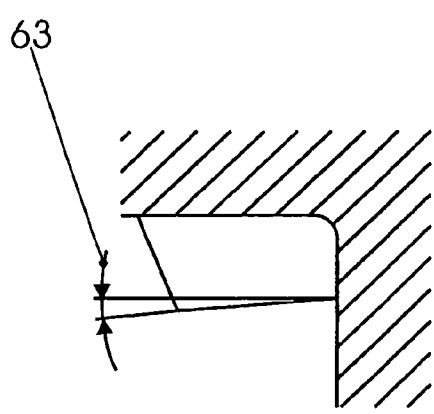
FIG. 6 illustrates a view toward C in FIG. 5.

Finally, FIG. 6 shows that the coupling teeth 50, 57 can also be undercut. The undercutting angle 63 only has to amount to a few degrees, for example to two degrees.

The invention claimed is:

1. A manual helical planetary transmission comprising a housing, a sun gear, a planet carrier with helical planet gears and an axially displaceable annulus gear which can be selectively coupled to the housing or to one of two other members of the planetary transmission, the planetary transmission further comprising:
   first coupling teeth arranged at both sides all around end faces of the annulus gear, the first coupling teeth being axially direction and having a sawtooth shape in a section normal to an axis of the annulus gear, and have a gently rising first flank;
   second coupling teeth arranged at the housing and at one of the two other members of the planetary transmission, the second coupling teeth being axially directed and having a sawtooth shape in a section normal to the axis of the housing, and have a gently rising first flank fit into the gaps formed by the first coupling teeth;
   wherein, in a respective shift ratio, peripheral forces acting on the annulus gear press the gently rising first flanks of the first coupling teeth against the gently rising first flanks of the second coupling teeth at the housing or at the planet carrier and fix the annulus gear in an engaged position.

2. The manual helical planetary transmission in accordance with claim 1, wherein one of the two other members of the planetary transmission the planet carrier is coupled to the axially displaceable annulus gear.

3. The manual helical planetary transmission in accordance with claim 1, wherein the first coupling teeth project inwardly and the second coupling teeth project outwardly.

4. The manual helical planetary transmission in accordance with claim 1, wherein a pitch circle of the first and second coupling teeth has a larger radius than a pitch circle of running teeth of the annulus gear.

5. The manual helical planetary transmission in accordance with claim 4, wherein an angle of inclination of the gently rising flanks of the first and second coupling teeth amounts to 25 to 30 degrees with a helical angle of the running teeth of 9 to 12 degrees.

6. The manual helical planetary transmission in accordance with claim 1, wherein the first and second coupling teeth have a steeply falling second flank following the gently rising flanks.

7. The manual helical planetary transmission in accordance with claim 6, wherein an angle of inclination of the steeply falling flanks amounts to 45 to 62 degrees.

8. The manual helical planetary transmission in accordance with claim 1, wherein the first and the second coupling teeth have roof-shaped boundary surfaces at the end face.

9. The manual helical planetary transmission in accordance with claim 1, wherein the gently rising first flanks of the first and second coupling teeth and a steeply falling second flank of the first and second coupling teeth have an undercut with an angle of 1 to 5 degrees.

10. The manual helical planetary transmission in accordance with claim 1, wherein, in a section normal to the axis, the gently rising first flank of the first coupling teeth is convex and the gently rising first flank of the second coupling teeth is concave.

11. The manual helical planetary transmission in accordance with claim 1, wherein the gently rising first flank of the first coupling teeth in the section normal to the axis is concave and the gently rising first flank of the second coupling teeth is convex.

12. The manual helical planetary transmission in accordance with claim 1, wherein the second coupling teeth are formed at a toothed ring.

13. A transfer case having the manual helical planetary transmission of claim 1, wherein the drive takes place via the sun gear and the output drive via the planet carrier; and
   the second coupling teeth are attached to the planet carrier to provide a road gear.

14. A transfer case having the manual helical planetary transmission of claim 1, wherein the drive takes place via the sun gear and the output drive via the planet carrier; and
   the second coupling teeth are attached to the housing to provide an off-road gear.

* * * * *